Dec. 29, 1959          R. L. OHLS          2,918,935
MULTI-WAY VALVE WITH PLASTIC SEALS
Filed June 7, 1957          4 Sheets-Sheet 1
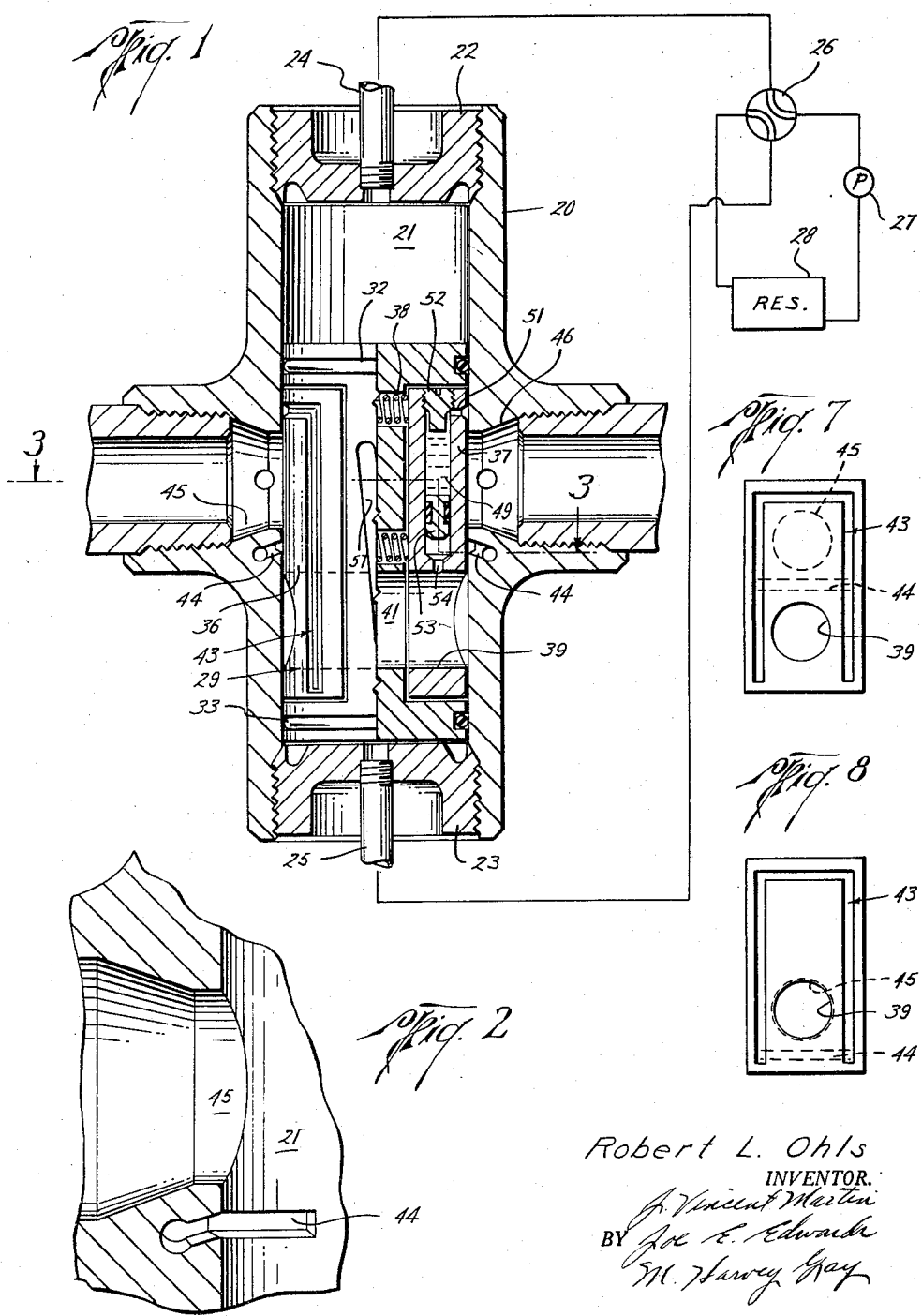
Robert L. Ohls
INVENTOR.
BY
ATTORNEYS

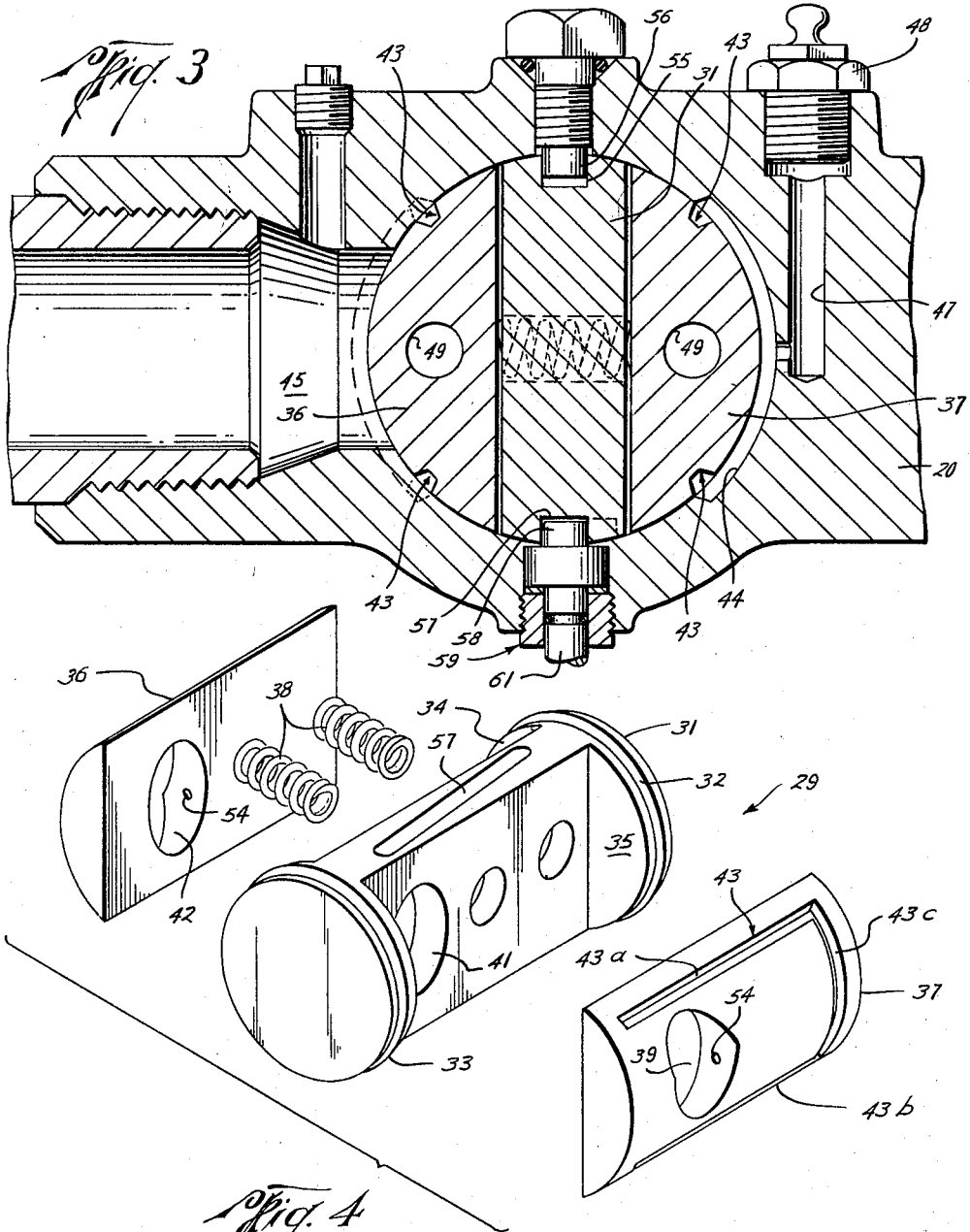

Dec. 29, 1959 R. L. OHLS 2,918,935
MULTI-WAY VALVE WITH PLASTIC SEALS
Filed June 7, 1957 4 Sheets-Sheet 3
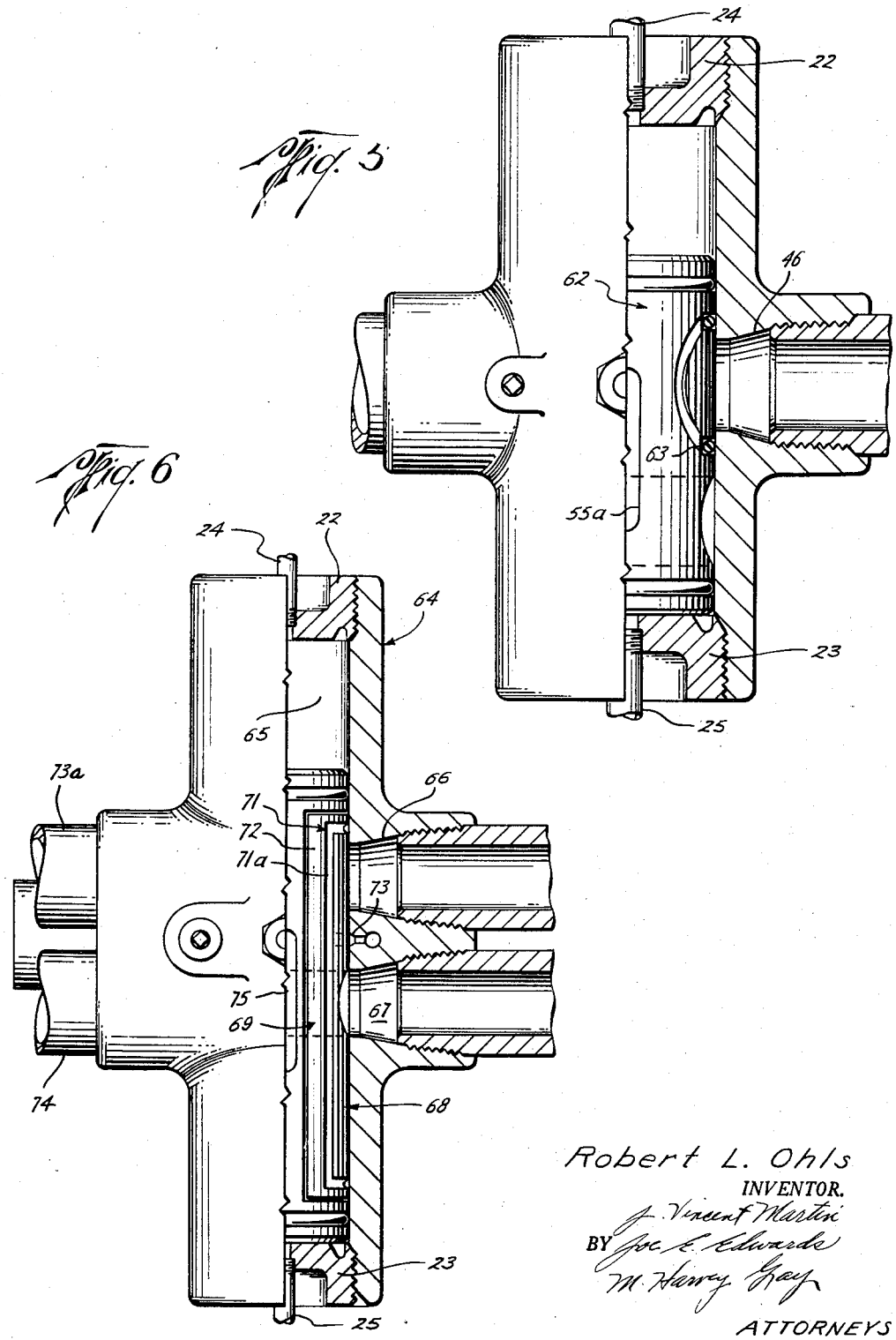
Robert L. Ohls
INVENTOR.
BY
ATTORNEYS

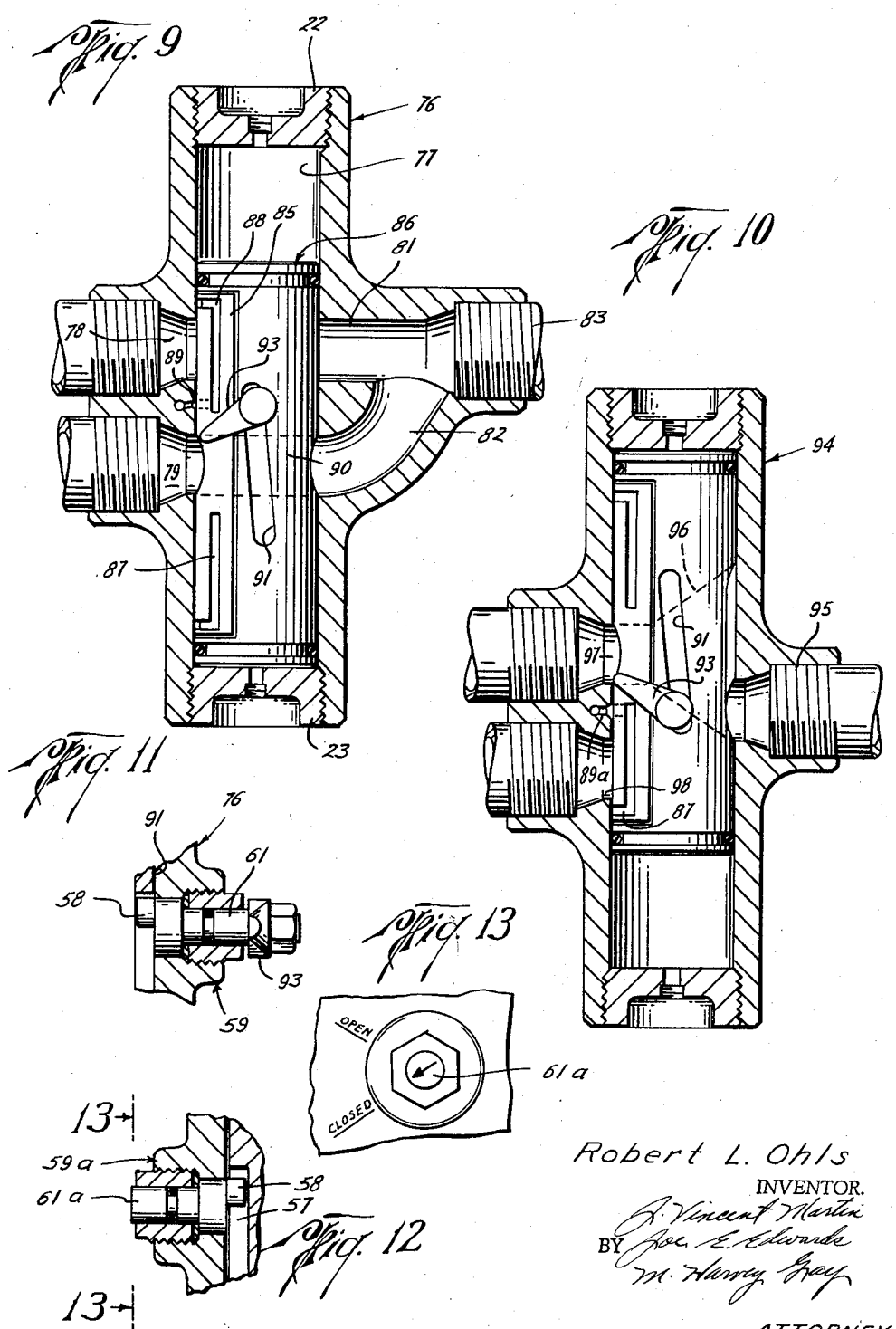

United States Patent Office 2,918,935
Patented Dec. 29, 1959

2,918,935
MULTI-WAY VALVE WITH PLASTIC SEALS

Robert L. Ohls, Houston, Tex., assignor to Mission Manufacturing Company, Houston, Tex., a corporation of Texas Application June 7, 1957, Serial No. 664,232

7 Claims. (Cl. 137—553)

This invention relates to valves and more particularly to valves of the type having longitudinally reciprocal cores or valve members.

It is an object of this invention to provide a plug valve having a pressure shifted longitudinally reciprocal valve member with exterior indicating means mechanically operated by the valve member which will not interfere with reciprocation of the valve member.

Another object is to provide a plug valve with a new and improved type of indicating means.

Another object is to provide a plug valve having a pressure shifted longitudinally reciprocal valve member with exterior indicating means mechanically operated by the valve member which points to either the line open to flow in the case of a three-way valve or to open and close indicia in the case of a two-way valve.

Another object is to provide a three-way valve employing a plastic seal.

Another object is to provide a three-way valve employing a plastic seal pressurized by upstream line pressure.

Another object is to provide a three-way valve employing a plastic seal in which the plastic seal reservoir is carried in the valve member and may be loaded from the exterior of the valve with the valve member in any position.

Others objects, features and advantages of this invention will be apparent from the drawings, specifications and claims.

In the drawings wherein there are shown illustrative embodiments of this invention and wherein like reference numerals indicate like parts.

Figure 1 is a sectional view through a valve embodying this invention and a schematic illustration of a control system for the valve;

Figure 2 is a fragmentary view on an enlarged scale of a portion of the body of the valve shown in Figure 1 and illustrating the arcuate groove in the body which communicates with the groove in the valve member;

Figure 3 is a view along the lines 3—3 of Figure 1;

Figure 4 is an exploded perspective view of the valve member or core employed in the valve of Figure 1;

Figure 5 is a view partially in elevation and partially in cross-section through a modified form of valve embodying this invention;

Figure 6 is a view partially in elevation and partially in cross-section of another embodiment of this invention;

Figure 7 is a diagram illustrating the relationship of the plastic seal grooves of the body and valve member and the flowways through the valve member and body when the valve of Figure 1 is closed;

Figure 8 is a view similar to Figure 7 illustrating the relationship of the seal grooves and flowways in the body and valve member when the valve is open;

Figure 9 is a sectional view through still another form of this invention;

Figure 10 is a sectional view through still another form of this invention;

Figure 11 is a fragmentary section view through the valve of Figure 9 showing the general assembly for the indicating means;

Figure 12 is a view similar to Figure 11 showing a modified form of indicating means; and Figure 13 is a view along the lines 13—13 of Figure 12.

Referring first to Figure 1, the valve illustrated includes a body 20 having a cylindrical bore 21 therein. The bore is closed at opposite ends by caps 22 and 23. Conduits 24 and 25 communicate with the opposite ends of bore 21 and alternately pressurize and vent opposite ends of the bore with shifting of the four-way valve 26.

Fluid is alternately fed under pressure to one end of the bore by pump 27 and fluid in the other end of the bore is returned through the four-way valve to the reservoir 28. Any other desired means may be utilized to alternately pressurize opposite ends of the bore 21 such as natural gas under formation pressure, etc.

The valve member or core indicated generally at 29 is mounted in the bore 21 for reciprocation therein with alternate pressurizing and venting of the opposite ends of the bore. Reference to Figure 4 will show that the valve member 29 is preferably made in three pieces. The piece 31 acts as a piston and is provided on its opposite ends with appropriate seals such as O-rings 32 and 33 which provide pressure responsive areas on opposite ends of the valve member 29. These areas are responsive to pressure introduced alternately through the conduits 24 and 25.

Recesses 34 and 35 are provided in opposite sides of the valve piece 31 and the floating plates or seal segments 36 and 37 are positioned in recesses 34 and 35 respectively. Suitable means are provided for urging the seal plates 36 and 37 away from each other such as the coil springs 38.

The three pieces of the valve member 29 are provided with registering holes 39, 41 and 42 to provide a flowway through the valve member.

A seal is provided between the valve member and valve body by a plastic packing contained within grooves in the valve and body. In each of the floating seal plates of the valve member there is provided a packing groove 43 which preferably has portions 43a and 43b extending parallel to the direction of reciprocation of the valve member. The two portions 43a and 43b are joined at one end by a groove portion 43c. In the body there is provided an arcuate groove 44 which opens into the bore as best shown in Figure 2. Groove 44 extends circumferentially of bore 21 between points which are always in communication with the portions 43a and 43b of groove 43. With the valve member in its Figure 1 position, one set of grooves 43 and 44 surrounds flowway 45 and another set of grooves 43 and 44 surrounds flowway 46. With the valve member in this position and the grooves filled with plastic packing under pressure as will appear below the valve member will prevent flow between flowways 45 and 46.

When the valve member is shifted to its other extreme position, that is into abutment with closure 22, the flowway in the valve member will be in register with the flowways 45 and 46 in the valve body and flow through the valve will be permitted.

Plastic packing is fed into the arcuate groove 44 in the body through a passageway 47 (Figure 3). The passageway is closed by a conventional zerk fitting 48 which permits introduction of plastic packing into passageway 47 with a pressure gun. Packing is forced under pressure through the arcuate groove 44 and into one of the grooves in the valve member 43. Packing is also forced into a reservoir 49 in the valve member as shown in Figure 1. This reservoir communicates with the groove 43 through a port 51. The reservoir 49 illustrated in Figure 1 is provided by a cylindrical bore closed at one end by plug 52 and at the other end by a piston 53. The piston 53 is in turn exposed to the flowway through the valve member through port 54.

From the above, it will be seen that plastic packing is forced through the arcuate groove 44 into the groove 43 in the valve member and thence into the reservoir 49 until the piston 53 is in approximately its Figure 1 position. As the fitting 48 will not permit packing to flow in a reverse direction, the packing may be pressurized in the grooves 43 and 44 by pressure acting on the piston 53. If the valve is closed and the pressure in flowway 45 is greater than in flowway 46, then the seal will be perfected about the flowway 46. In this case, the high pressure from flowway 45 will pass about the valve member and into the flowway in the valve member. This high pressure will be exerted on the piston 53 which will pressurize the plastic packing to approximately the same pressure as present in the flowway 45. Thus, passage of the high pressure past the seal retaining groove surrounding flowway 46 will be prevented as the plastic packing will be under substantially the same pressure as the high pressure fluid.

It will be appreciated that the valve is symmetrical on both sides of a centerline and a similar means for pressurizing the groove contained in the seal segment 36 of the valve member is provided. A seal will occur about the flowway 45 in the manner explained above when the high pressure is present in flowway 46.

Referring now particularly to Figure 3, it will be noted that the piston portion 31 of the valve member is provided with a longitudinally extending slot 55. A guide member 56, suitably secured in the body 20, projects into the cylindrical bore 21 and into the groove 55 of the valve member to hold the valve member against rotation.

On the opposite side of the valve there is provided a means for indicating the position of the valve member. A slot 57 extends substantially longitudinally of the valve member in the piston portion 31 thereof. However, this slot extends at a slight angle to the direction of reciprocation of the valve member.

An eccentric cam member 58 is journaled in the side wall of the body by a suitable assembly indicated generally at 59 with the eccentric extending into the bore 21 and fitting in the slot 57. Another view of the assembly 59 is shown in Figure 11. A modified form of assembly 59a is shown in Figures 12 and 13. Here the pointer is provided by an arrow on the stub shaft 61a. As the valve reciprocates, the guide 56 prevents its rotation and therefore the angled slot 57 forces the eccentric 58 to reciprocate and rotate the shaft 61 on which it is mounted. The shaft 61 may carry any desired form of pointer such as indicated in Figures 11 and 13 to indicate the position of the valve member. In the form of valve shown in Figure 1 suitable indicia may be provided on the exterior of the valve body to which a pointer on shaft 61 corresponds to indicate whether the valve is open or closed. Note Figure 13 which illustrates such indicia.

It will be appreciated that with this form of indicator the pointer does not take up an excessive amount of space. The indicator assembly will not interfere with operation of the valve because the rotating shaft will not tend to freeze in place. Note the very small portion of shaft 61 which is exposed to the elements and could cause the shaft to freeze due to corrosion.

Referring now to Figure 5, the form of value shown corresponds very closely to the Figure 1 form of valve except that a one piece valve member 62 is employed and the seal between the valve member and the body is provided by a resilient seal element such as O-ring 63. The remainder of the valve is identical to the valve shown in Figure 1 and the indicating means illustrated in Figure 3 is provided on the back side of the valve of Figure 5. The one piece valve member 62 has a slot 55a which receives the guide 56 to prevent rotation of the valve member.

Referring now to Figure 6, one form of three-way valve embodying this invention is shown. The body indicated generally at 64 has a cylindrical bore 65 therethrough. The bore is closed at opposite ends with the closures 22 and 23. The bore 65 is somewhat longer than in the case of the two-way valve because the body is provided with two longitudinally spaced flowways 66 and 67. The flowways 66 and 67 provide alternate outlets from the body 64. The valve body is symmetrical on both sides of a centerline and longitudinally spaced inlets (not shown) are directly opposite to the outlets 66 and 67.

A valve member indicated generally at 68 is mounted in the bore 65 for reciprocation therein in response to alternately pressurizing and venting opposite ends of bore 65. This valve member 68 conforms generally to the valve member of the Figure 1 form of this embodiment except that it only has one seal segment and it is elongated to permit it to alternately seal about two different outlets 66 and 67. (Note Figure 9 which shows a single segment form of valve member.) Again approximately midway of the valve member, there is provided a plurality of holes through the parts of the valve member as indicated at 69 which provide a flowway through the valve member. The seal for the valve member is provided in generally the same way as in Figure 1 except that the seal groove 71 in the seal segment 72 of the valve member is a continuous closed groove. The groove 71 has longitudinally extending portions 71a on opposite sides of the two flow-ways 66 and 67 and the flowway 69 in the valve member. These two portions 71a communicate with an arcuate groove 73 in the body which functions as explained in conjunction with the arcuate groove 44 in the Figure 1 embodiment of this invention. In this case, the arcuate groove cooperates with a portion of the closed groove 71 in the valve member to define a seal area about either one of the flowways 66 or 67 depending upon the position of the valve member. For instance, in the position of the valve member as shown, the arcuate groove and a portion of groove 71 cooperate to form a seal about flowway 66 to prevent flow therethrough. While the arcuate groove and the remainder of seal groove 71 surround the flowway 67, the flowway in the valve member is in line with the flowway 67 and therefore flow will occur through this flowway.

It will be appreciated that with a valve member employing seal segments as in Figure 6 the seal must always be provided on the downstream side of the valve member. Therefore, the two inlets to the valve provided by conduits 73a and 74 should be from a common source as some fluid will flow between these conduits through bore 65. If desired, the valve member may be made symmetrical on both sides of a center line as in Figure 1 so that the valve body will not have an upstream and downstream side and may be installed in any system without regard to orientation of the valve.

Again the valve member is held against rotation by a guide running in slot 75. An indicator means is provided on the opposite side of the valve for indicating the position of the valve member as will be explained in conjunction with other forms of the three-way valve.

Referring now to Figure 9, there is shown a further form of three-way valve. The body indicated generally at 76 has a longitudinal cylindrical bore 77 therein closed by the closure members 22 and 23. Longitudinally spaced flowways 78 and 79 provide outlets from the body. A pair of longitudinally spaced flowways 81 and 82 leading from a common inlet 83 supply fluid to be controlled to the valve.

The valve member is built along the same lines as in the valve of Figure 6 and has only one seal segment 85. The floating seal segment 85 is provided with a pair of generally U-shaped grooves 87 and 88. These U-shaped grooves are arranged at the opposite ends of the valve member with their open ends confronting each other. The grooves conform generally to the closed groove 71 of the Figure 6 form of invention except that an intermediate section of the portion 71a of the Figure 6 groove has been omitted. The U-shaped grooves alternately move into a position to connect with the arcuate groove 89 which extends circumferentially of and opens into the bore 77. Thus, with the valve member in the position shown, the upper seal groove 88 communicates with the arcuate groove 89 to define a closed blanking space on the valve member opposite outlet 78 to prevent flow therethrough. With the valve member in this position, the flowway indicated in dashed outline at 90 provides for flow from inlet 83 to outlet 79.

The piston and reservoir structure as shown in Figure 1 are duplicated above and below the flowway in the valve. The reservoir for the upper groove 88 must be filled with the valve in the position shown and then the valve shifted upwardly to bring the groove 87 into register with the arcuate groove 89 and to fill the reservoir for groove 87.

The valve member is held against rotation by a groove and guide as shown in Figure 3.

The valve member is provided with a slot 91 running slightly diagonal to the direction of reciprocation of the valve member. The cam 58 as shown in Figures 3, 11 and 13 runs in slot 91 to provide indicating means for the valve. In this form of valve, it is preferred to provide indicating means such as an indicator arm 93 on shaft 61 which points directly at the outlet of the valve through which flow is taking place. For instance, with the valve as shown in Figure 9, the valve member is in a position for flow through outlet 79 and the indicator arm is pointing directly at outlet 79.

Referring now to Figure 10, there is shown a slightly modified form of the valve of Figure 9. The body indicated generally at 94 is provided with a single inlet 95 instead of the plural inlets of the Figure 9 form. Flow from the inlet through the valve member is provided by a flowway which is extended on the upstream side of the valve member in a longitudinal direction as indicated in dashed outline at 96. The flowway reduces as it passes through the valve member to a size comparable to the outlet openings 97 and 98 in the valve body. Otherwise, the valve is identical to the valve as shown in Figure 9. It will be apparent that with the valve in the position shown in Figure 10, flow from inlet 95 will pass through the flowway 96 in the valve member and out through outlet 97. At this time, the U-shaped seal groove 87 about outlet 98 will be cooperating with the arcuate groove 89a in the body to seal about outlet 98 and prevent flow therethrough.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. A three way valve comprising, a body having a cylindrical bore therein, three flowways opening into the bore, with two of the flowways opening into the bore at longitudinal spaced points, a slide valve member having a flowway therethrough positioned in the bore and directing flow alternatively through the longitudinally spaced flowways, an arcuate packing groove in the body and opening into the bore, said groove extending circumferentially of the bore between the longitudinally spaced flowways, packing grooves in the periphery of the valve member communicating with the arcuate groove when the valve member is shifted in one direction to surround one of said longitudinally spaced flowways and communicating with the arcuate groove when the valve member is shifted in the other direction to surround another longitudinally spaced flowway, means for maintaining said grooves filled with plastic packing for sealing between the valve member and body about said longitudinally spaced flowways, and means for shifting the valve member.

2. The valve of claim 1 wherein a passageway extends through the body from the arcuate groove to the exterior of the body to provide means for loading the groove and the means for maintaining a plastic packing in the groove with a supply of plastic packing.

3. A three way valve comprising, a body having a cylindrical bore with closed ends, three flowways opening into the side wall of the cylindrical bore with two of the flowways spaced longitudinally of the bore, a cylindrical valve member having a flowway therethrough mounted for longitudinal sliding movement in the bore, and directing flow alternately through the longitudinally spaced flowways, an arcuate packing groove in the body and opening into the bore, said groove extending circumferentially of the bore between the longitudinally spaced flowways, packing grooves in the periphery of the valve member communicating with the arcuate groove when the valve member is shifted in one direction to surround one of said longitudinal spaced flowway, means for maintaining said grooves filled with plastic packing for sealing between the valve member and body about said longitudinally spaced flowways, and means for alternately pressurizing and venting the opposite ends of the cylindrical bore to reciprocate the valve member and provide alternately for flow through said longitudinally spaced flowways.

4. The valve of claim 3 wherein the grooves in the valve member are provided by a continuous groove which surrounds the flowway through the valve member and the longitudinally spaced flowways, and is always in communication with the arcuate groove.

5. A three way valve comprising, a body having a cylindrical bore with closed ends, three flowways opening into the side wall of the cylindrical bore with two of the flowways spaced longitudinally of the bore, a cylindrical valve member having a flowway therethrough mounted for longitudinal sliding movement in the bore, and directing flow alternately through the longitudinally spaced flowways, an arcuate packing groove in the body and opening into the bore, said groove extending circumferentially of the bore between the longitudinally spaced flowways, packing grooves in the periphery of the valve member communicating with the arcuate groove when the valve member is shifted in one direction to surround one of said longitudinal spaced flowways and communicating with the arcuate groove when the valve member is shifted in the other direction to surround another longitudinally spaced flowway, means for maintaining said grooves filled with plastic packing for sealing between the valve member and body about said longitudinally spaced flowways, means preventing rotation of the valve member, a shaft journaled in the wall of the body, means carried by the shaft and engaging the valve member to cause rotation of the shaft with reciprocation of the valve member, and exterior means carried by the shaft and indicating the position of the valve member.

6. A three way valve comprising, a body having a cylindrical bore with closed ends, three flowways opening into the side wall of the cylindrical bore with two of the flowways spaced longitudinally of the bore, a cylindrical valve member having a flowway therethrough mounted for longitudinal sliding movement in the bore, and directing flow alternately through the longitudinally spaced flowways, an arcuate packing groove in the body and opening into the bore, said groove extending circumferentially of the bore between the longitudinally spaced flowways, packing grooves in the periphery of the valve member communicating with the arcuate groove when the valve member is shifted in one direction to surround one of said longitudinal spaced flowways and communicating with the arcuate groove when the valve member is shifted in the other direction to surround another longitudinally spaced flowway, means for maintaining said grooves filled with plastic packing for sealing between the valve member and body about said longitudinally spaced flowways, means preventing rotation of the valve member, a longitudinal slot in the valve member extending in a direction to intersect at a slight angle a plane passing through the longitudinal axis of the valve member, an eccentric cam member journaled in the body and sliding in said slot, and exterior means carried by the cam member for indicating the position of the valve member.

7. The valve of claim 6 wherein the means for maintaining the grooves filled with plastic packing includes a reservoir in the valve member loaded through means communicating with the arcuate groove.

References Cited in the file of this patent

UNITED STATES PATENTS

| | | |
|---|---|---|
| 1,233,340 | Gosline | July 17, 1917 |
| 2,042,067 | Leach | May 26, 1936 |
| 2,176,594 | Nordstrom | Oct. 17, 1939 |
| 2,326,398 | Shafer | Aug. 10, 1943 |
| 2,337,841 | Shafer | Dec. 28, 1943 |
| 2,591,031 | Volpin | Apr. 1, 1952 |
| 2,624,364 | Detlefsen | Jan. 6, 1953 |
| 2,868,221 | Eichenberg | Jan. 13, 1959 |